(12) United States Patent
Yuan et al.

(10) Patent No.: US 11,493,992 B2
(45) Date of Patent: Nov. 8, 2022

(54) INVOKING AUTOMATED ASSISTANT FUNCTION(S) BASED ON DETECTED GESTURE AND GAZE

(71) Applicant: Google LLC, Mountain View, CA (US)

(72) Inventors: Yuan Yuan, Redwood City, CA (US); Kenneth Mixter, Los Altos Hills, CA (US); Tuan Nguyen, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/110,716

(22) Filed: Dec. 3, 2020

(65) Prior Publication Data

US 2021/0089125 A1    Mar. 25, 2021

Related U.S. Application Data

(63) Continuation of application No. 16/606,529, filed as application No. PCT/US2018/031164 on May 4, 2018, now Pat. No. 10,890,969.

(51) Int. Cl.
  *G06F 3/16* (2006.01)
  *G10L 15/22* (2006.01)
  *G06F 3/01* (2006.01)

(52) U.S. Cl.
  CPC .............. *G06F 3/013* (2013.01); *G10L 15/22* (2013.01); *G06F 3/017* (2013.01); *G06F 3/16* (2013.01); *G06F 2203/0381* (2013.01)

(58) Field of Classification Search
  CPC ........ G02B 27/0093; G02B 2027/0138; G02B 2027/0178; G02B 2027/0187;
(Continued)

(56) References Cited

U.S. PATENT DOCUMENTS 8,885,882 B1   11/2014   Yin et al.
9,250,703 B2   2/2016   Hernandez-Abrego et al.
(Continued)

FOREIGN PATENT DOCUMENTS

EP   2891954   7/2015
EP   2966644   1/2016
(Continued)

OTHER PUBLICATIONS

European Patent Office; Communication Under Rule 7193) EPC issued in Application No. 18728773.5; 57 pages; dated Feb. 18, 2021.

(Continued)

*Primary Examiner* — Michael J Eurice
(74) *Attorney, Agent, or Firm* — Middleton Reutlinger

(57) ABSTRACT

Invoking one or more previously dormant functions of an automated assistant in response to detecting, based on processing of vision data from one or more vision components: (1) a particular gesture (e.g., of one or more "invocation gestures") of a user; and/or (2) detecting that a gaze of the user is directed at an assistant device that provides an automated assistant interface (graphical and/or audible) of the automated assistant. For example, the previously dormant function(s) can be invoked in response to detecting the particular gesture, detecting that the gaze of the user is directed at an assistant device for at least a threshold amount of time, and optionally that the particular gesture and the directed gaze of the user co-occur or occur within a threshold temporal proximity of one another.

17 Claims, 8 Drawing Sheets

(58) Field of Classification Search
CPC . G06F 3/011; G06F 3/013; G06F 3/16; G06F 3/167; G06F 3/017; G06F 3/002; G06F 3/0304; G06F 3/03547; G06F 3/038; G06F 3/0488; G06F 3/005; G06F 16/90332; G06F 2203/0381; G06K 9/00335; G06K 9/00355; G06K 9/00389; G06N 3/0454; G06N 3/08; G06N 20/00; G06T 2207/20081; G06T 2207/20084; G10L 15/16; G10L 15/22; G10L 15/063; G10L 25/78; H04L 67/10; H04L 67/42; H04N 7/185; H04N 13/383; H04N 21/414
See application file for complete search history.

(56) References Cited

U.S. PATENT DOCUMENTS

| | | | |
|---|---|---|---|
| 9,263,044 | B1 | 2/2016 | Cassidy et al. |
| 9,423,870 | B2 | 8/2016 | Teller et al. |
| 9,691,411 | B2 | 6/2017 | Scherer et al. |
| 9,832,452 | B1* | 11/2017 | Fotland ................. G06F 3/0304 |
| 9,939,896 | B2 | 4/2018 | Teller et al. |
| 10,075,491 | B2 | 9/2018 | Smus |
| 10,156,900 | B2 | 12/2018 | Publicover et al. |
| 10,423,225 | B2 | 9/2019 | Suk |
| 10,540,015 | B2 | 1/2020 | Li |
| 10,726,521 | B2 | 7/2020 | Leong |
| 10,768,693 | B2 | 9/2020 | Powderly et al. |
| 10,853,911 | B2 | 12/2020 | Leong |
| 10,890,969 | B2 | 1/2021 | Yuan et al. |
| 2002/0135618 | A1 | 9/2002 | Maes et al. |
| 2004/0193413 | A1 | 9/2004 | Wilson et al. |
| 2006/0192775 | A1 | 8/2006 | Nicholson et al. |
| 2012/0062729 | A1 | 3/2012 | Hart et al. |
| 2012/0295708 | A1 | 11/2012 | Hernandez-Abrego et al. |
| 2013/0144616 | A1* | 6/2013 | Bangalore ............ G10L 15/197 704/226 |
| 2013/0144629 | A1 | 6/2013 | Johnston et al. |
| 2013/0304479 | A1 | 11/2013 | Teller et al. |
| 2014/0016837 | A1 | 1/2014 | Nechyba et al. |
| 2014/0149754 | A1 | 5/2014 | Silva et al. |
| 2014/0247208 | A1 | 9/2014 | Henderek et al. |
| 2014/0306874 | A1 | 10/2014 | Finocchio et al. |
| 2014/0337949 | A1 | 11/2014 | Hoyos |
| 2014/0361973 | A1 | 12/2014 | Raux et al. |
| 2015/0033130 | A1* | 1/2015 | Scheessele ............ G06F 3/012 715/728 |
| 2015/0193005 | A1 | 7/2015 | Di Censo et al. |
| 2016/0011853 | A1 | 1/2016 | Rogers et al. |
| 2016/0026253 | A1 | 1/2016 | Bradski et al. |
| 2016/0042648 | A1 | 2/2016 | Kothuri |
| 2016/0132290 | A1 | 5/2016 | Raux |
| 2016/0203454 | A1* | 7/2016 | Kogoshi ................. G06V 20/52 382/116 |
| 2016/0284134 | A1 | 9/2016 | Kamhi et al. |
| 2016/0309081 | A1 | 10/2016 | Frahm et al. |
| 2016/0328621 | A1 | 11/2016 | Negi et al. |
| 2016/0330346 | A1 | 11/2016 | Hayashi et al. |
| 2016/0373269 | A1* | 12/2016 | Okubo ................. H04L 12/282 |
| 2017/0026764 | A1 | 1/2017 | Rajendran |
| 2017/0160813 | A1* | 6/2017 | Divakaran ............ G06N 5/022 |
| 2017/0169818 | A1* | 6/2017 | VanBlon ............ G10L 15/222 |
| 2017/0289766 | A1 | 10/2017 | Scott et al. |
| 2017/0312614 | A1 | 11/2017 | Tran et al. |
| 2017/0315825 | A1 | 11/2017 | Gordon et al. |
| 2018/0011543 | A1* | 1/2018 | Funami ............ G06F 3/04812 |
| 2018/0061400 | A1 | 3/2018 | Carbune et al. |
| 2018/0185753 | A1* | 7/2018 | Nakagawa ............ G06F 3/011 |
| 2018/0246569 | A1 | 8/2018 | Arakawa et al. |
| 2019/0094981 | A1* | 3/2019 | Bradski ................. G06F 3/017 |
| 2019/0102706 | A1 | 4/2019 | Frank et al. |
| 2019/0138268 | A1 | 5/2019 | Andersen et al. |
| 2019/0187787 | A1* | 6/2019 | White ................. G10L 15/22 |
| 2019/0199759 | A1 | 6/2019 | Anderson et al. |
| 2019/0246036 | A1 | 8/2019 | Wu et al. |
| 2019/0294252 | A1* | 9/2019 | Li ............................ G06F 3/167 |
| 2019/0304157 | A1* | 10/2019 | Amer ................. G06N 3/0454 |
| 2019/0324527 | A1 | 10/2019 | Presant et al. |
| 2019/0369748 | A1 | 12/2019 | Hindi et al. |
| 2020/0104653 | A1* | 4/2020 | Solomon ............ G06F 3/04842 |
| 2020/0167597 | A1 | 5/2020 | Nguyen et al. |
| 2020/0286484 | A1* | 9/2020 | Scanlon ................. G06F 3/012 |
| 2020/0341546 | A1 | 10/2020 | Yuan et al. |
| 2020/0342223 | A1 | 10/2020 | Mixter et al. |
| 2020/0349966 | A1 | 11/2020 | Konzelmann et al. |
| 2020/0380977 | A1 | 12/2020 | Unter Ecker |
| 2020/0396533 | A1 | 12/2020 | Meiyappan et al. |

FOREIGN PATENT DOCUMENTS

| | | |
|---|---|---|
| JP | 11024694 | 1/1999 |
| JP | H1124694 | 1/1999 |
| JP | 2010102235 | 5/2010 |
| JP | 2012242609 | 12/2012 |
| JP | 2014048936 | 3/2014 |
| JP | 2015514254 | 5/2015 |
| JP | 2015135674 A | 7/2015 |
| JP | 2016004270 | 1/2016 |
| JP | 2016502137 A | 1/2016 |
| JP | 2016502721 A | 1/2016 |
| JP | 2016131288 | 7/2016 |
| JP | 2016526211 A | 9/2016 |
| JP | 2016212624 A | 12/2016 |
| JP | 2017010176 | 1/2017 |
| JP | 2017138476 | 8/2017 |
| JP | 2017138536 | 8/2017 |
| JP | 2019505011 A | 2/2019 |
| KR | 20150138109 | 12/2015 |
| WO | 2014078480 A1 | 5/2014 |
| WO | 2014085269 | 6/2014 |
| WO | 2014203495 | 2/2017 |
| WO | 2017002473 | 4/2018 |
| WO | 2018061173 | 4/2018 |
| WO | 2017203769 | 4/2019 |
| WO | WO-2019212567 A1 * | 11/2019 ............ G06F 3/038 |

OTHER PUBLICATIONS

European Patent Office; Communication Pursuant to Article 94(3) EPC issue in Application Ser. No. 18728773.5; 6 pages; dated Aug. 21, 2020.

European Patent Office; International Search Report and Written Opinion of Ser. No. PCT/US2018/031164; 13 pages; dated Oct. 11, 2018.

Siatras, S. et al, "Visual Lip Activity Detection and Speaker Detection Using Mouth Regions Intensities;" IEEE Transactions on Circuits and Systems for Video Technology; vol. 19, Issue 1; 5 pages; Dec. 9, 2008.

European Patent Office; International Search Report and Written Opinion of PCT Ser. No. PCT/US2019/030487; 20 pages; dated Jul. 16, 2020.

International Search Report and Written Opinion issued in Application No. PCT/US2018/031170 dated Dec. 14, 2018 (16 Pages).

European Patent Office; Invitation to Pay Additional Fees; PCT Ser. No. PCT/US2019/030487; 13 pages; May 25, 2020.

European Patent Office: Intention To Grant issued in Application No. 18727930.2 dated Oct. 2, 2020.

Intellectual Property India; Examination Report issued in Application No. 202027052360; 7 pages; dated Sep. 10, 2021.

Japan Patent Office; Notice of Reasons for Rejection issued in application No. 2021-512356, 11 pages, dated Jan. 31, 2022.

European Patent Office; Extended European Search Report issued in Application No. 21211767.5, 10 pages, dated Feb. 22, 2022.

Japanese Patent Office; Notice of Reasons for Rejection issued in app. No. 2021-512356, 9 pages, dated Sep. 5, 2022.

* cited by examiner

INVOKING AUTOMATED ASSISTANT FUNCTION(S) BASED ON DETECTED GESTURE AND GAZE

BACKGROUND

Humans may engage in human-to-computer dialogs with interactive software applications referred to herein as "automated assistants" (also referred to as "digital agents," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input. An automated assistant responds to a request by providing responsive user interface output, which can include audible and/or visual user interface output.

As mentioned above, many automated assistants are configured to be interacted with via spoken utterances. To preserve user privacy and/or to conserve resources, a user must often explicitly invoke an automated assistant before the automated assistant will fully process a spoken utterance. The explicit invocation of an automated assistant typically occurs in response to certain user interface input being received at a client device. The client device includes an assistant interface that provides, to a user of the client device, an interface for interfacing with the automated assistant (e.g., receives input from the user, and provides audible and/or graphical responses), and that interfaces with one or more additional components that implement the automated assistant (e.g., remote server device(s) that process user inputs and generate appropriate responses).

Some user interface inputs that can invoke an automated assistant via a client device include a hardware and/or virtual button at the client device for invoking the automated assistant (e.g., a tap of a hardware button, a selection of a graphical interface element displayed by the client device). Many automated assistants can additionally or alternatively be invoked in response to one or more spoken invocation phrases, which are also known as "hot words/phrases" or "trigger words/phrases". For example, a spoken invocation phrase such as "Hey Assistant," "OK Assistant", and/or "Assistant" can be spoken to invoke an automated assistant.

SUMMARY

As mentioned above, many client devices that facilitate interaction with automated assistants—also referred to herein as "assistant devices"—enable users to engage in touch-free interaction with automated assistants. For example, assistant devices often include microphones that allow users to provide vocal utterances to invoke and/or otherwise interact with an automated assistant. Assistant devices described herein can additionally or alternatively incorporate, and/or be in communication with, one or more vision components (e.g., camera(s)), Light Detection and Ranging (LIDAR) component(s), radar component(s), etc.) to facilitate touch-free interactions with an automated assistant.

Implementations disclosed herein relate to invoking one or more previously dormant functions of an automated assistant in response to detecting, based on processing of vision data from one or more vision components: (1) a particular gesture (e.g., of one or more "invocation gestures") of a user; and/or (2) detecting that a gaze of the user is directed at an assistant device that provides an automated assistant interface (graphical and/or audible) of the automated assistant. For example, the previously dormant function(s) can be invoked in response to detecting the particular gesture, detecting that the gaze of the user is directed at an assistant device for at least a threshold amount of time, and optionally that the particular gesture and the directed gaze of the user co-occur or occur within a threshold temporal proximity of one another (e.g., within 0.5 seconds, within 1.0 seconds, or other threshold temporal proximity). For instance, the previously dormant function(s) can be invoked in response to detecting a particular gesture (e.g., a "thumbs up" gesture and/or "hand wave" gesture) and in response to detecting a directed gaze that is of at least a 0.5 second duration and that co-occurred with the particular gesture, or occurred within 1.0 second of the particular gesture.

In some versions of those implementations, the one or more previously dormant functions can be invoked in response to detecting the gesture and the directed gaze alone. For example, in response to detecting the gesture and the directed gaze alone, certain sensor data generated by one or more sensor components can be transmitted by the client device to one or more remote automated assistant components (whereas no sensor data from the sensor component(s) was being transmitted prior to detecting the gesture and the directed gaze). The certain sensor data can include, for example, vision and/or audio data captured after detecting the gesture and the directed gaze and/or buffered vision and/or audio data captured during performance of the gesture and/or during the directed gaze. In this manner, the transmission of data to remote computing components over a data network is carried out selectively and at appropriate times. This provides for efficient use of network capacity, as well as the computing and other hardware resources involved in sending and receiving the data over the network. The efficiency improvements in usage of data networks and computing resources on remote systems can lead to significant savings in terms of power usage by transmitters and receivers in the network, as well as in terms of memory operations and processor usage at the remote system. Corresponding effects may also be experienced at the client device. These effects, particularly over time and the ongoing operation of the automated assistant, allow significant additional capacity to be experienced in the network and in the computing apparatus as a whole, including the devices and systems which run the assistant. This additional capacity can be used for further communication in the data network, whether assistant-related or not, without the need to expand network capability e.g. through additional or updated infrastructure, and additional computing operations in the computing apparatus. Other technical improvements will be evident from the following discussion.

In some other versions of those implementations, the one or more previously dormant functions can be invoked in response to detecting the gesture and the directed gaze, and detecting the occurrence of one or more other condition(s). The occurrence of the one or more other conditions can include, for example: detecting, based on audio data, voice activity (e.g., any voice activity, voice activity of the user providing the gesture and directed gaze, voice activity of an authorized user, voice activity that includes a spoken invocation phrase) in temporal proximity to the detected gesture and directed gaze; detecting, based on vision data, mouth movement of the user that co-occurs with, or is in temporal proximity to, the detected gesture and directed gaze; detecting, based on audio data and/or vision data, that the user is an authorized user; and/or detecting other condition(s). For example, buffered audio data can be transmitted by the client device to one or more remote automated assistant components in response to detecting the gesture and the directed gaze, and in response to detecting voice activity in at least part of the buffered audio data (e.g., using a voice activity detector (VAD) module). This has corresponding advantages to those explained above.

In some implementations disclosed herein, the previously dormant function(s) of an automated assistant that are invoked in response to detecting a gesture and directed gaze can include certain processing of certain sensor data (e.g., audio data, video, image(s), etc.) and/or rendering (e.g., graphically and/or audibly) of certain content. For example, prior to an invocation that is based on detecting a gesture and directed gaze, an automated assistant may perform only limited (or no) processing of certain sensor data such as audio data, video/image data, etc. For instance, prior to invocation, the automated assistant can locally process some sensor data in monitoring for an explicit invocation, but will "discard" the data after local processing and without causing the data to be processed by one or more additional components that implement the automated assistant (e.g., remote server device(s) that process user inputs and generate appropriate responses). However, in response to invocation, such data can be processed by the additional component(s). In these and other manners, processing and/or network resources can be reduced by only transmitting and/or performing certain processing of certain sensor data in response to an invocation.

Also, for example, prior to explicit invocation, an automated assistant can render (e.g., graphically) only limited (or no) content. However, in response to invocation, the automated assistant can render other content, such as content that is tailored to a user that invoked the automated assistant. For example, prior to explicit invocation no content may be graphically rendered via a display screen controlled by the automated assistant, or only limited lower-power consumption content may be rendered (e.g., only the current time on a small portion of the display screen). However, in response to invocation, the automated assistant can cause additional and optionally higher-power consumption content to be graphically rendered via the display screen and/or audibly rendered via speaker(s), such as a weather forecast, a daily event summary, and/or other content that may be displayed more brightly on the display screen and/or occupy a greater portion of the display screen. In these and other manners, power consumption can be reduced via displaying lower-power consumption content (or no content) prior to invocation, and only displaying the higher-power consumption content in response to invocation.

In some implementations, in monitoring for a particular gesture and in monitoring for a gaze that is directed to the client device, trained machine learning model(s) (e.g., neural network model(s)) that are stored locally on the client device are utilized by the client device to at least selectively process at least portions of vision data from vision component(s) of the client device (e.g., image frames from camera(s) of the client device). For example, in response to detecting presence of one or more users, the client device can process, for at least a duration (e.g., for at least a threshold duration and/or until presence is no longer detected) at least portion(s) of vision data utilizing the locally stored machine learning model(s) in monitoring for the particular gesture and the directed gaze. The client device can detect presence of one or more users using a dedicated presence sensor (e.g., a passive infrared sensor (PIR)), using vision data and a separate machine learning model (e.g., a separate machine learning model trained solely for human presence detection), and/or using audio data and a separate machine learning model (e.g., VAD using a VAD machine learning model). In implementations where processing of vision data in monitoring for a particular gesture is contingent on first detecting presence of one or more users, power resources can be conserved through the non-continual processing of vision data in monitoring for gesture(s) and/or a directed gaze. Rather, in those implementations, the processing of vision data in monitoring for gesture(s) and/or a directed gaze can occur only in response to detecting, via one or more lower-power consumption techniques, presence of one or more user(s) in an environment of the assistant device.

In some implementations where local machine learning model(s) are utilized in monitoring for a particular gesture and a directed gaze, at least one gesture detection machine learning model is utilized in monitoring for the gesture, and a separate gaze detection machine learning model is utilized in monitoring for the gaze. In some versions of those implementations, one or more "upstream" models (e.g., object detection and classification model(s)) can be utilized to detect portions of vision data (e.g., image(s)) that are likely a face, likely eye(s), likely arms/body, etc.—and those portion(s) processed using a respective machine learning model. For example, face and/or eye portion(s) of an image can be detected using the upstream model, and processed using the gaze detection machine learning model. Also, for example, arms and/or body portion(s) of an image can be detected using the upstream model, and processed using the gesture detection machine learning model. As yet another example, human portion(s) of an image can be detected using the upstream model, and processed using both the gaze detection machine learning model and the gesture detection machine learning model.

Optionally, the gaze detection machine learning model can process higher resolution vision data (e.g., images) than the gesture detection machine learning model. This can enable utilization of the gesture detection machine learning model to be more efficient through the processing of lower resolution images. Further, optionally the gaze detection machine learning model can be utilized to process portion(s) of an image only after the gesture detection machine learning model has been utilized to detect a likely gesture (or vice versa). This can also lead to computational efficiencies, by not continuously processing image data utilizing both models.

In some implementations, face matching, eye matching, voice matching, and/or other techniques can be utilized to identify a particular user profile that is associated with the gesture and/or directed gaze, and content rendered, by the automated assistant application of the client device, which is tailored to the particular user profile. The rendering of the tailored content can be one of the function(s) of the automated assistant that is invoked in response to detecting the gesture and directed gaze. Optionally, identification of the particular user profile occurs only after a directed gaze and gesture have been detected. In some implementations, and as mentioned above, for invocation detection the occurrence of one or more additional conditions can also be required—where the additional condition(s) are in addition to gaze and/or gesture detection. For example, in some implementations the additional condition(s) can include identifying that the user providing the gesture and the directed gaze is associated with user profile that is authorized for the client device (e.g., using face matching, voice matching, and/or other techniques).

In some implementations, certain portions of video(s)/image(s) can be filtered out/ignored/weighted less heavily in detecting gesture and/or gaze. For example, a television captured in video(s)/image(s) can be ignored to prevent false detections as a result of a person rendered by the television (e.g., a weatherperson). For instance, a portion of an image can be determined to correspond to a television based on a separate object detection/classification machine learning model, in response to detecting a certain display frequency in that portion (i.e., that matches a television refresh rate) over multiple frames for that portion, etc. Such a portion can be ignored in gesture and/or directed gaze detection techniques described herein, to prevent detection of a gesture and/or directed gaze from a television or other video display device. As another example, picture frames can be ignored. These and other techniques can mitigate false-positive invocations of an automated assistant, which can conserve various computational and/or network resources that would otherwise be consumed in a false-positive invocation. Also, in various implementations, once a TV, picture frame, etc. location is detected, it can optionally continue to be ignored over multiple frames (e.g., while verifying intermittently, until movement of client device or object(s) is detected, etc.). This can also conserve various computational resources.

The above description is provided as an overview of various implementations disclosed herein. Those various implementations, as well as additional implementations, are described in more detail herein.

In some implementations, a method is performed by one or more processors of a client device that facilitates touch-free interaction between one or more users and an automated assistant. The method includes receiving a stream of image frames that are based on output from one or more cameras of the client device. The method further includes processing the image frames of the stream using at least one trained machine learning model stored locally on the client device to monitor for occurrence of both: an invocation gesture of a user captured by at least one of the image frames, and a gaze of the user that is directed toward the client device. The method further includes detecting, based on the monitoring, occurrence of both: the invocation gesture, and the gaze. The method further includes, in response to detecting the occurrence of both the invocation gesture and the gaze: causing at least one function of the automated assistant to be activated.

These and other implementations of the technology can include one or more of the following features.

In some implementations, the at least one function of the automated assistant that is activated in response to detecting the occurrence of both the invocation gesture and the gaze includes: transmitting of audio data, captured via one or more microphones of the client device, to a remote server associated with the automated assistant.

In some implementations, the at least one function that is activated in response to detecting the occurrence of both the invocation gesture and the gaze additionally or alternatively includes: transmitting of additional image frames to a remote server associated with the automated assistant, the additional image frames based on output from one or more of the cameras and received after detecting the occurrence of both the invocation gesture and the gaze.

In some implementations, the at least one function that is activated in response to detecting the occurrence of both the invocation gesture and the gaze additionally or alternatively includes: processing of buffered audio data at the client device, where the buffered audio data is stored in memory at the client device and is captured via one or more microphones of the client device, and where the processing of the buffered audio data includes one or both of: invocation phrase detection processing, and automatic speech recognition. In some versions of those implementations, the processing of the buffered audio data includes the automatic speech recognition, and the automatic speech recognition includes voice-to-text processing. In some additional or alternative versions of those implementations, the processing of the buffered audio data includes invocation phrase detection processing and the method further includes: in response to the invocation phrase detection processing detecting presence of an invocation phrase in the buffered audio data, performing one or both of: transmitting further audio data, captured via the one or more microphones of the client device, to a remote server associated with the automated assistant; and transmitting of additional image frames to a remote server associated with the automated assistant, where the additional image frames are based on output from one or more of the cameras and received after detecting the occurrence of both the invocation gesture and the gaze.

In some implementations, processing the image frames of the stream using at least one trained machine learning model stored locally on the client device to monitor for occurrence of both the invocation gesture and the gaze includes: using a first trained machine learning model to monitor for occurrence of the invocation gesture; and using a second trained machine learning model to monitor for the gaze of the user that is directed toward the client device. In some versions of those implementations, using the second trained machine learning model to monitor for the gaze of the user that is directed toward the client device occurs only in response to detecting occurrence of the invocation gesture using the first trained machine learning model. In some of those versions, or in other versions, using the first trained machine learning model to monitor for the occurrence of the invocation gesture includes processing a first resolution versions of the image frames using the first machine learning model; and using the second trained machine learning model to monitor for the gaze of the user includes processing second resolution versions of the image frames using the second machine learning model.

In some implementations, the method further includes: receiving a stream of audio data frames that are based on output from one or more microphones of the client device; processing the audio data frames of the stream using at least one trained invocation phrase detection machine learning model stored locally on the client device to monitor for occurrence of a spoken invocation phrase; and detecting the occurrence of the spoken invocation phrase based on the monitoring for the occurrence of the spoken invocation phrase. In some of those implementations, causing the at least one function of the automated assistant to be activated is in response to detecting the occurrence of the spoken invocation phrase in temporal proximity to both the invocation gesture and the gaze. In some versions of those implementations, the at least one function that is activated includes one or both of: transmitting of additional audio data frames captured via the one or more microphones of the client device, to a remote server associated with the automated assistant; and transmitting of one or more additional image frames from one or more of the cameras, to the remote server associated with the automated assistant.

In some implementations, processing the image frames of the stream using at least one trained machine learning model stored locally on the client device to monitor for occurrence of both the invocation gesture and the gaze includes: processing the image frames using a first trained machine learning model to predict a region of the image frames that includes a human face; and processing the region of the image frames using a second trained machine learning model trained to detect the gaze of the user.

In some implementations, processing the image frames of the stream using at least one trained machine learning model stored locally on the client device to monitor for occurrence of both the invocation gesture and the gaze includes: determining that a region of the image frames corresponds to an electronic display; and in response to determining that the region corresponds to the electronic display, ignoring the region in monitoring for the occurrence of both the invocation gesture and the gaze. In some of those implementations, determining that the region of the image frames corresponds to the electronic display is based on detecting a display frequency, in the region of the image frames, which corresponds to a display frequency of an electronic display.

In some implementations, the method further includes: detecting, based on a signal from a presence sensor, that a human is present in an environment of the client device; and causing the one or more cameras to provide the stream of image frames in response to detecting that the human is present in the environment.

In some implementations, a client device is provided that includes at least one vision component, at least one microphone, one or more processors, and memory operably coupled with the one or more processors. The memory stores instructions that, in response to execution of the instructions by one or more of the processors, cause one or more of the processors to perform the following operations: receiving a stream of vision data that is based on output from the vision component of the client device; processing the vision data using at least one trained machine learning model stored locally on the client device to monitor for occurrence of both: an invocation gesture of a user captured by the vision data, and a gaze of the user that is directed toward the client device; detecting, based on the monitoring, occurrence of both: the invocation gesture, and the gaze; and in response to detecting the occurrence of both the invocation gesture and the gaze: transmitting, by the client device to one or more remote automated assistant components, one or both of: additional vision data that is based on output from the vision component, and audio data that is based on output from the microphone of the client device. The operations can optionally further include receiving, in response to the transmitting, responsive content; and rendering the responsive content via one or more user interface output devices of the client device.

In some implementations, a system is provided that includes at least one vision component and one or more processors receiving a stream of vision data that is based on output from the vision component. One or more of the processors are configured to: process the vision data using at least one trained machine learning model stored locally on the client device to monitor for occurrence of both: an invocation gesture of a user captured by the vision data, and a gaze of the user that is directed toward the client device; detect, based on the monitoring, occurrence of both: the invocation gesture, and the gaze; and in response to detecting the occurrence of both the invocation gesture and the gaze: cause at least one function of the automated assistant to be activated.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
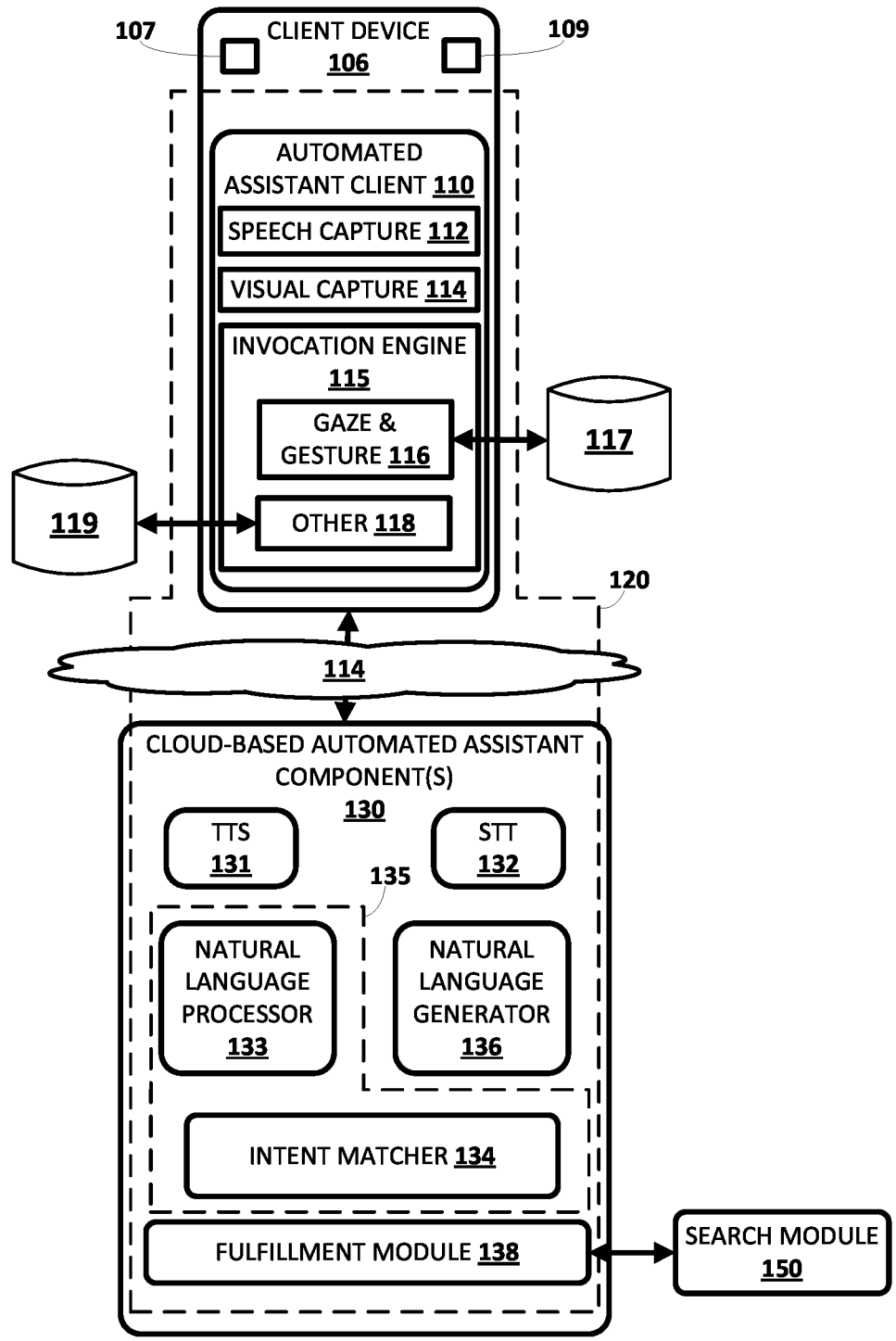
FIG. 1 is a block diagram of an example environment in which implementations disclosed herein may be implemented.

FIG. 1 illustrates an example environment in which techniques disclosed herein may be implemented. The example environment includes one or more client computing devices 106. Each client device 106 may execute a respective instance of an automated assistant client 110. One or more cloud-based automated assistant components 130 can be implemented on one or more computing systems (collectively referred to as a "cloud" computing system) that are communicatively coupled to client devices 106 via one or more local and/or wide area networks (e.g., the Internet) indicated generally at 114. The cloud-based automated assistant components 130 can be implemented, for example, via a cluster of high-performance servers.

In various implementations, an instance of an automated assistant client 110, by way of its interactions with one or more cloud-based automated assistant components 130, may form what appears to be, from a user's perspective, a logical instance of an automated assistant 120 with which the user may engage in a human-to-computer interactions (e.g., spoken interactions, gesture-based interactions, and/or touch-based interactions). One instance of such an automated assistant 120 is depicted in FIG. 1 in dashed line. It thus should be understood that each user that engages with an automated assistant client 110 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 110 executing on a client device 106 operated by the user and optionally one or more cloud-based automated assistant components 130 (which may be shared amongst multiple automated assistant clients 110). It should also be understood that in some implementations, automated assistant 120 may respond to a request from any user regardless of whether the user is actually "served" by that particular instance of automated assistant 120.

The one or more client devices 106 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (which in some cases may include a vision sensor), a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided. As noted previously, some client devices 106 may take the form of assistant devices that are primarily designed to facilitate interactions between users and automated assistant 120 (e.g., a standalone interactive device with speaker(s) and a display).

Client device 106 can be equipped with one or more vision components 107 having one or more fields of view. Vision component(s) 107 may take various forms, such as monographic cameras, stereographic cameras, a LIDAR component, a radar component, etc. The one or more vision components 107 may be used, e.g., by a visual capture module 114, to capture vision frames (e.g., image frames (still images or video)) of an environment in which client device 106 is deployed. These vision frames may then be at least selectively analyzed, e.g., by a gaze and gesture module 116 of invocation engine 115, to monitor for occurrence of: a particular gesture (of one or more candidate gestures) of a user captured by the vision frames and/or a directed gaze from the user (i.e., a gaze that is directed toward the client device 106). The gaze and gesture module 116 can utilize one or more trained machine learning models 117 in monitoring for occurrence of a particular gesture and/or a directed gaze.

In response to detection of the particular gesture and the directed gaze (and optionally in response to detection of one or more other condition(s) by other conditions module 118), the invocation engine 115 can invoke one or more previously dormant functions of the automated assistant 120. Such dormant functions can include, for example, processing of certain sensor data (e.g., audio data, video, image(s), etc.) and/or rendering (e.g., graphically and/or audibly) of certain content.

As one non-limiting example, prior to detection of the particular gesture and the directed gaze, vision data and/or audio data captured at the client device 106 can be processed and/or temporarily buffered only locally at the client device 106 (i.e., without transmission to the cloud-based automated assistant component(s) 130). However, in response to detection of the particular gesture and the directed gaze, audio data and/or vision data (e.g., recently buffered data and/or data received after the detection) can be transmitted to the cloud-based automated assistant component(s) 130 for further processing. For example, the detection of the particular gesture and the directed gaze can obviate a need for the user to speak an explicit invocation phrase (e.g., "OK Assistant") in order to cause a spoken utterance of the user to be fully processed by the automated assistant 120, and responsive content generated by the automated assistant 120 and rendered to the user.

For instance, rather than the user needing to speak "OK Assistant, what's today's forecast" to obtain today's forecast, the user could instead: perform a particular gesture, look at the client device 106, and speak only "what's today's forecast" during or temporally near (e.g., within a threshold of time before and/or after) performing the gesture and/or looking at the client device 106. Data corresponding to the spoken utterance "What's today's forecast" (e.g., audio data that captures the spoken utterance, or a textual or other semantic conversion thereof) can be transmitted by the client device 106 to the cloud-based automated assistant component(s) 130 in response to detecting the gesture and the directed gaze, and in response to the spoken utterance being received during and/or temporally near the gesture and directed gaze. In another example, rather than the user needing to speak "OK Assistant, turn up the heat" to increase the temperature of his/her home via a connected thermostat, the user could instead: perform a particular gesture, look at the client device 106, and speak only "turn up the heat" during or temporally near (e.g., within a threshold of time before and/or after) performing the gesture and/or looking at the client device 106. Data corresponding to the spoken utterance "turn up the heat" (e.g., audio data that captures the spoken utterance, or a textual or other semantic conversion thereof) can be transmitted by the client device 106 to the cloud-based automated assistant component(s) 130 in response to detecting the gesture and the directed gaze, and in response to the spoken utterance being received during and/or temporally near the gesture and directed gaze. In another example, rather than the user needing to speak "OK Assistant, open the garage door" to open his/her garage, the user could instead: perform a particular gesture, look at the client device 106, and speak only "open the garage door" during or temporally near (e.g., within a threshold of time before and/or after) performing the gesture and/or looking at the client device 106. Data corresponding to the spoken utterance "open the garage door" (e.g., audio data that captures the spoken utterance, or a textual or other semantic conversion thereof) can be transmitted by the client device 106 to the cloud-based automated assistant component(s) 130 in response to detecting the gesture and the directed gaze, and in response to the spoken utterance being received during and/or temporally near the gesture and directed gaze. In some implementations, the transmission of the data by the client device 106 can be further contingent on the other condition module 118 determining the occurrence of one or more additional conditions. For example, the transmission of the data can be further based on local voice activity detection processing of the audio data, performed by the other conditions module 118, indicating that voice activity is present in the audio data. Also, for example, the transmission of the data can additionally or alternatively be further based on determining, by the other conditions module 118, that the audio data corresponds to the user that provided the gesture and the directed gaze. For instance, a direction of the user (relative to the client device 106) can be determined based on the vision data, and the transmission of the data can be further based on determining, by the other conditions module 118, that a spoken utterance in the audio data comes from the same direction (e.g., using beamforming and/or other techniques). Also, for instance, a user profile of the user can be determined based on the vision data (e.g., using facial recognition) and the transmission of the data can be further based on determining, by the other conditions module 118, that a spoken utterance in the audio data has voice characteristics that match the user profile. As yet another example, transmission of the data can additionally or alternatively be further based on determining, by the other conditions module 118 based on vision data, that mouth movement of the user co-occurred with the detected gesture and/or directed gaze of the user, or occurred with a threshold amount of time of the detected gesture and/or directed gaze. The other conditions module 118 can optionally utilize one or more other machine learning models 119 in determining that other condition(s) are present. Additional description of implementations of gaze and gesture module 116, and of the other conditions module 118, is provided herein (e.g., with reference to FIGS. 2A-2C).

Each of client computing device 106 and computing device(s) operating cloud-based automated assistant components 130 may include one or more memories for storage of data and software applications, one or more processors for accessing data and executing applications, and other components that facilitate communication over a network. The operations performed by client computing device 106 and/or by automated assistant 120 may be distributed across multiple computer systems. Automated assistant 120 may be implemented as, for example, computer programs running on one or more computers in one or more locations that are coupled to each other through a network.

As noted above, in various implementations, client computing device 106 may operate an automated assistant client 110. In some of those various implementations, automated assistant client 110 may include a speech capture module 112, the aforementioned visual capture module 114, and an invocation engine 115, which can include the gaze and gesture module 116 and optionally the other conditions module 118. In other implementations, one or more aspects of speech capture module 112, visual capture module 114, and/or invocation engine 115 may be implemented separately from automated assistant client 110, e.g., by one or more cloud-based automated assistant components 130.

In various implementations, speech capture module 112, which may be implemented using any combination of hardware and software, may interface with hardware such as a microphone(s) 109 or other pressure sensor to capture an audio recording of a user's spoken utterance(s). Various types of processing may be performed on this audio recording for various purposes, as will be described below. In various implementations, visual capture module 114, which may be implemented using any combination of hardware or software, may be configured to interface with visual component 107 to capture one or more vision frames (e.g., digital images), that correspond to an optionally adaptable field of view of the vision sensor 107.

Speech capture module 112 may be configured to capture a user's speech, e.g., via a microphone(s) 109, as mentioned previously. Additionally or alternatively, in some implementations, speech capture module 112 may be further configured to convert that captured audio to text and/or to other representations or embeddings, e.g., using speech-to-text ("STT") processing techniques. However, because client device 106 may be relatively constrained in terms of computing resources (e.g., processor cycles, memory, battery, etc.), speech capture module 112 local to client device 106 may be configured to convert a finite number of different spoken phrases—such as phrases that invoke automated assistant 120—to text (or to other forms, such as lower dimensionality embeddings). Other speech input may be sent to cloud-based automated assistant components 130, which may include a cloud-based STT module 132.

Cloud-based TTS module 131 may be configured to leverage the virtually limitless resources of the cloud to convert textual data (e.g., natural language responses formulated by automated assistant 120) into computer-generated speech output. In some implementations, TTS module 131 may provide the computer-generated speech output to client device 106 to be output directly, e.g., using one or more speakers. In other implementations, textual data (e.g., natural language responses) generated by automated assistant 120 may be provided to client device 106, and a local TTS module of client device 106 may then convert the textual data into computer-generated speech that is output locally.

Cloud-based STT module 132 may be configured to leverage the virtually limitless resources of the cloud to convert audio data captured by speech capture module 112 into text, which may then be provided to natural language understanding module 135. In some implementations, cloud-based STT module 132 may convert an audio recording of speech to one or more phonemes, and then convert the one or more phonemes to text. Additionally or alternatively, in some implementations, STT module 132 may employ a state decoding graph. In some implementations, STT module 132 may generate a plurality of candidate textual interpretations of the user's utterance, and utilize one or more techniques to select a given interpretation from the candidates.

Automated assistant 120 (and in particular, cloud-based automated assistant components 130) may include an intent understanding module 135, the aforementioned TTS module 131, the aforementioned STT module 132, and other components that are described in more detail herein. In some implementations, one or more of the modules and/or modules of automated assistant 120 may be omitted, combined, and/or implemented in a component that is separate from automated assistant 120. In some implementations one or more of the components of automated assistant 120, such as intent understanding module 135, TTS module 131, STT module 132, etc., may be implemented at least on part on client devices 106 (e.g., in combination with, or to the exclusion of, the cloud-based implementations).

In some implementations, automated assistant 120 generates various content for audible and/or graphical rendering to a user via the client device 106. For example, automated assistant 120 may generate content such as a weather forecast, a daily schedule, etc., and can cause the content to be rendered in response to detecting a gesture and/or directed gaze from the user as described herein. Also, for example, automated assistant 120 may generate content in response to a free-form natural language input of the user provided via client device 106, in response to gestures of the user that are detected via vision data from visual component 107 of client device, etc. As used herein, free-form input is input that is formulated by a user and that is not constrained to a group of options presented for selection by the user. The free-form input can be, for example, typed input and/or spoken input.

Natural language processor 133 of intent understanding module 135 processes natural language input generated by user(s) via client device 106 and may generate annotated output (e.g., in textual form) for use by one or more other components of automated assistant 120. For example, the natural language processor 133 may process natural language free-form input that is generated by a user via one or more user interface input devices of client device 106. The generated annotated output includes one or more annotations of the natural language input and one or more (e.g., all) of the terms of the natural language input.

In some implementations, the natural language processor 133 is configured to identify and annotate various types of grammatical information in natural language input. For example, the natural language processor 133 may include a morphological module that may separate individual words into morphemes and/or annotate the morphemes, e.g., with their classes. Natural language processor 133 may also include a part of speech tagger configured to annotate terms with their grammatical roles. Also, for example, in some implementations the natural language processor 133 may additionally and/or alternatively include a dependency parser (not depicted) configured to determine syntactic relationships between terms in natural language input.

In some implementations, the natural language processor 133 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted), and the entity tagger of the natural language processor 133 can utilize such database(s) in entity tagging.

In some implementations, the natural language processor 133 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 133 may rely on annotations from one or more other components of the natural language processor 133. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 133 may use related prior input and/or other related data outside of the particular natural language input to determine one or more annotations.

Intent understanding module 135 may also include an intent matcher 134 that is configured to determine an intent of a user engaged in an interaction with automated assistant 120. While depicted separately from natural language processor 133 in FIG. 1, in other implementations, intent matcher 134 may be an integral part of natural language processor 133 (or more generally, of a pipeline that includes natural language processor 133). In some implementations, natural language processor 133 and intent matcher 134 may collectively form the aforementioned intent understanding module 135.

Intent matcher 134 may use various techniques to determine an intent of the user, e.g., based on output from natural language processor 133 (which may include annotations and terms of the natural language input), based on user touch inputs at a touch-sensitive display of client device 106, and/or based on gestures and/or other visual cues detected in vision data. In some implementations, intent matcher 134 may have access to one or more databases (not depicted) that include, for instance, a plurality of mappings between grammars and responsive actions (or more generally, intents), visual cues and responsive actions, and/or touch inputs and responsive actions. For example, the grammars included in the mappings can be selected and/or learned over time, and may represent common intents of users. For example, one grammar, "play <artist>", may be mapped to an intent that invokes a responsive action that causes music by the <artist> to be played on the client device 106 operated by the user. Another grammar, "[weather|forecast] today," may be match-able to user queries such as "what's the weather today" and "what's the forecast for today?" As another example, the visual cue to action mappings can include "general" mappings that are applicable to multiple users (e.g., all users) and/or user-specific mappings. Some examples of visual cue to action mappings include mappings for gestures. For instance, a "wave" gesture can be mapped to an action of causing tailored content (tailored to the user providing the gesture) to be rendered to the user, a "thumbs up" gesture can be mapped to a "play music" action; and a "high five" gesture can be mapped to a "routine" of automated assistant actions to be performed, such as turning on a smart coffee maker, turning on certain smart lights, and audibly rendering a news summary.

In addition to or instead of grammars, in some implementations, intent matcher 134 may employ one or more trained machine learning models, alone or in combination with one or more grammars, visual cues, and/or touch inputs. These trained machine learning models may also be stored in one or more databases and may be trained to identify intents, e.g., by embedding data indicative of a user's utterance and/or any detected user-provided visual cues into a reduced dimensionality space, and then determining which other embeddings (and therefore, intents) are most proximate, e.g., using techniques such as Euclidean distance, cosine similarity, etc.

As seen in the "play <artist>" example grammar above, some grammars have slots (e.g., <artist>) that can be filled with slot values (or "parameters"). Slot values may be determined in various ways. Often users will provide the slot values proactively. For example, for a grammar "Order me a <topping>pizza," a user may likely speak the phrase "order me a sausage pizza," in which case the slot <topping> is filled automatically. Additionally or alternatively, if a user invokes a grammar that includes slots to be filled with slot values, without the user proactively providing the slot values, automated assistant 120 may solicit those slot values from the user (e.g., "what type of crust do you want on your pizza?"). In some implementations, slots may be filled with slot values based on visual cues detected based on vision data captured by vision component 107. For example, a user could utter something like "Order me this many cat bowls" while holding up three fingers to visual component 107 of client device 106. Or, a user could utter something like "Find me more movies like this" while holding of a DVD case for a particular movie.

In some implementations, automated assistant 120 may facilitate (or "broker") transactions between users and agents, which may be independent software processes that receive input and provide responsive output. Some agents may take the form of third party applications that may or may not operate on computing systems that are separate from those that operate, for instance, cloud-based automated assistant components 130. One kind of user intent that may be identified by intent matcher 134 is to engage a third party application. For example, automated assistant 120 may provide access to an application programming interface ("API") to a pizza delivery service. A user may invoke automated assistant 120 and provide a command such as "I'd like to order a pizza." Intent matcher 134 may map this command to a grammar that triggers automated assistant 120 to engage with the third party pizza delivery service. The third party pizza delivery service may provide automated assistant 120 with a minimum list of slots that need to be filled in order to fulfill a pizza delivery order. Automated assistant 120 may generate and provide to the user (via client device 106) natural language output that solicits parameters for the slots.

Fulfillment module 138 may be configured to receive the predicted/estimated intent that is output by intent matcher 134, as well as an associated slot values (whether provided by the user proactively or solicited from the user) and fulfill (or "resolve") the intent. In various implementations, fulfillment (or "resolution") of the user's intent may cause various fulfillment information (also referred to as "responsive" information or data) to be generated/obtained, e.g., by fulfillment module 138.

Fulfillment information may take various forms because an intent can be fulfilled in a variety of ways. Suppose a user requests pure information, such as "Where were the outdoor shots of 'The Shining' filmed?" The intent of the user may be determined, e.g., by intent matcher 134, as being a search query. The intent and content of the search query may be provided to fulfillment module 138, which as depicted in FIG. 1 may be in communication with one or more search modules 150 configured to search corpuses of documents and/or other data sources (e.g., knowledge graphs, etc.) for responsive information. Fulfillment module 138 may provide data indicative of the search query (e.g., the text of the query, a reduced dimensionality embedding, etc.) to search module 150. Search module 150 may provide responsive information, such as GPS coordinates, or other more explicit information, such as "Timberline Lodge, Mt. Hood, Oreg." This responsive information may form part of the fulfillment information generated by fulfillment module 138.

Additionally or alternatively, fulfillment module 138 may be configured to receive, e.g., from intent understanding module 135, a user's intent and any slot values provided by the user or determined using other means (e.g., GPS coordinates of the user, user preferences, etc.) and trigger a responsive action. Responsive actions may include, for instance, ordering a good/service, starting a timer, setting a reminder, initiating a phone call, playing media, sending a message, initiating a routine of multiple actions, etc. In some such implementations, fulfillment information may include slot values associated with the fulfillment, confirmation responses (which may be selected from predetermined responses in some cases), etc.

Additionally or alternatively, fulfillment module 138 may be configured to infer intent(s) of a user (e.g., based on time of day, past interactions, etc.) and obtain responsive information for those intent(s). For example, the fulfillment module 138 can be configured to obtain a daily calendar summary for a user, a weather forecast for the user, and/or other content for the user. The fulfillment module 138 can further cause such content to be "pushed" for graphical and/or audible rendering to the user. For example, the rendering of such content can be the dormant functionality that is invoked in response to invocation engine 115 detecting the occurrence of a particular gesture and a directed gaze.

Natural language generator 136 may be configured to generate and/or select natural language output (e.g., words/ phrases that are designed to mimic human speech) based on data obtained from various sources. In some implementations, natural language generator 136 may be configured to receive, as input, fulfillment information associated with fulfillment of an intent, and to generate natural language output based on the fulfillment information. Additionally or alternatively, natural language generator 136 may receive information from other sources, such as third party applications, which it may use to compose natural language output for the user.

Figure 2A:
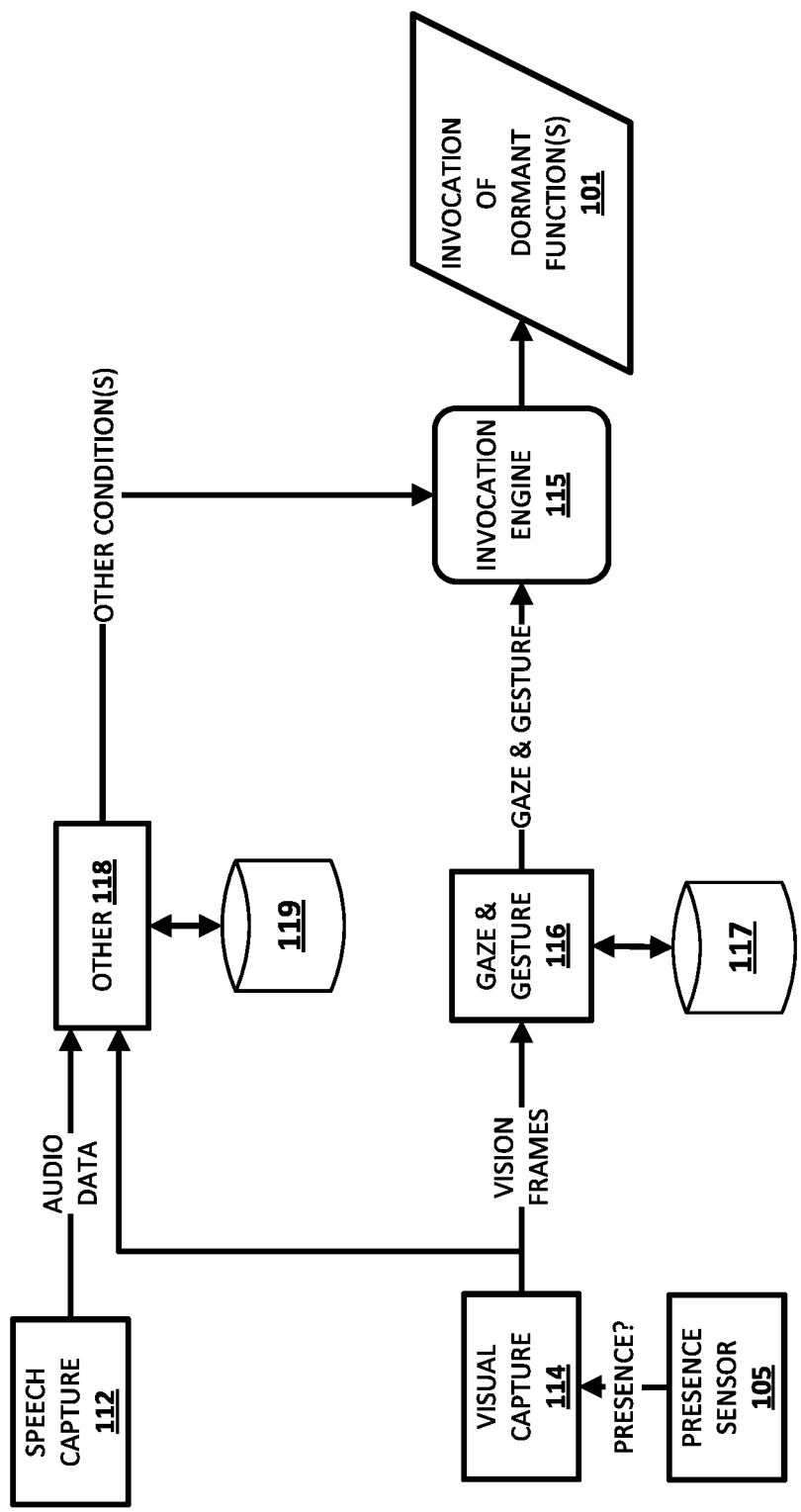
FIGS. 2A, 2B, and 2C depict example process flows that demonstrate various aspects of the present disclosure, in accordance with various implementations.
Figure 2B:
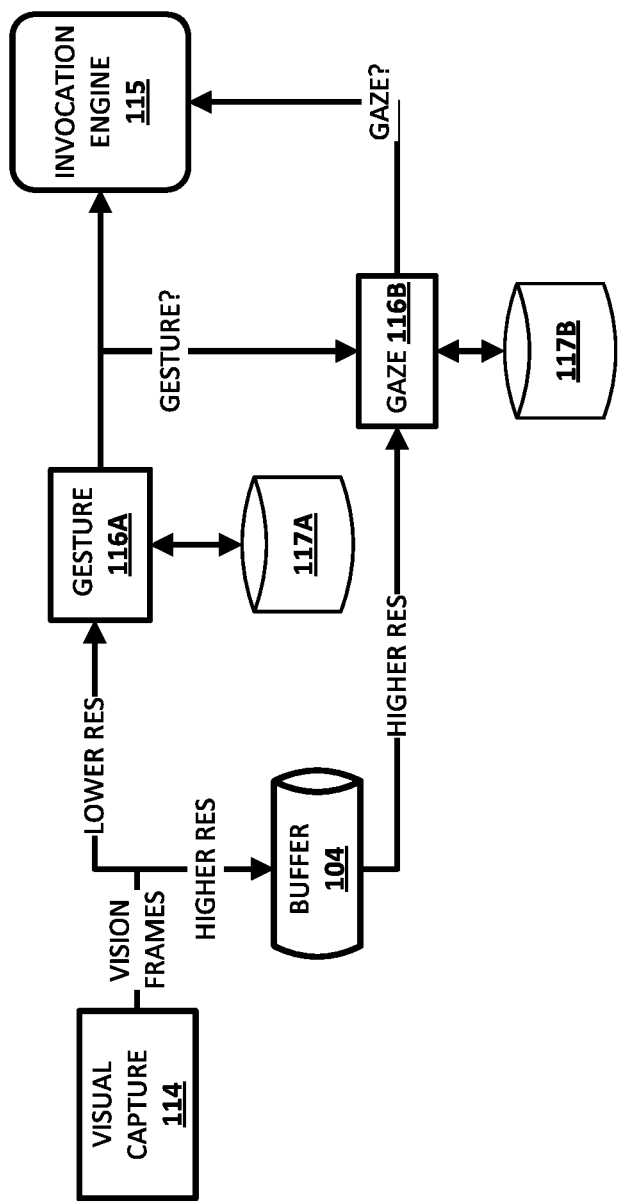
Figure 2C:
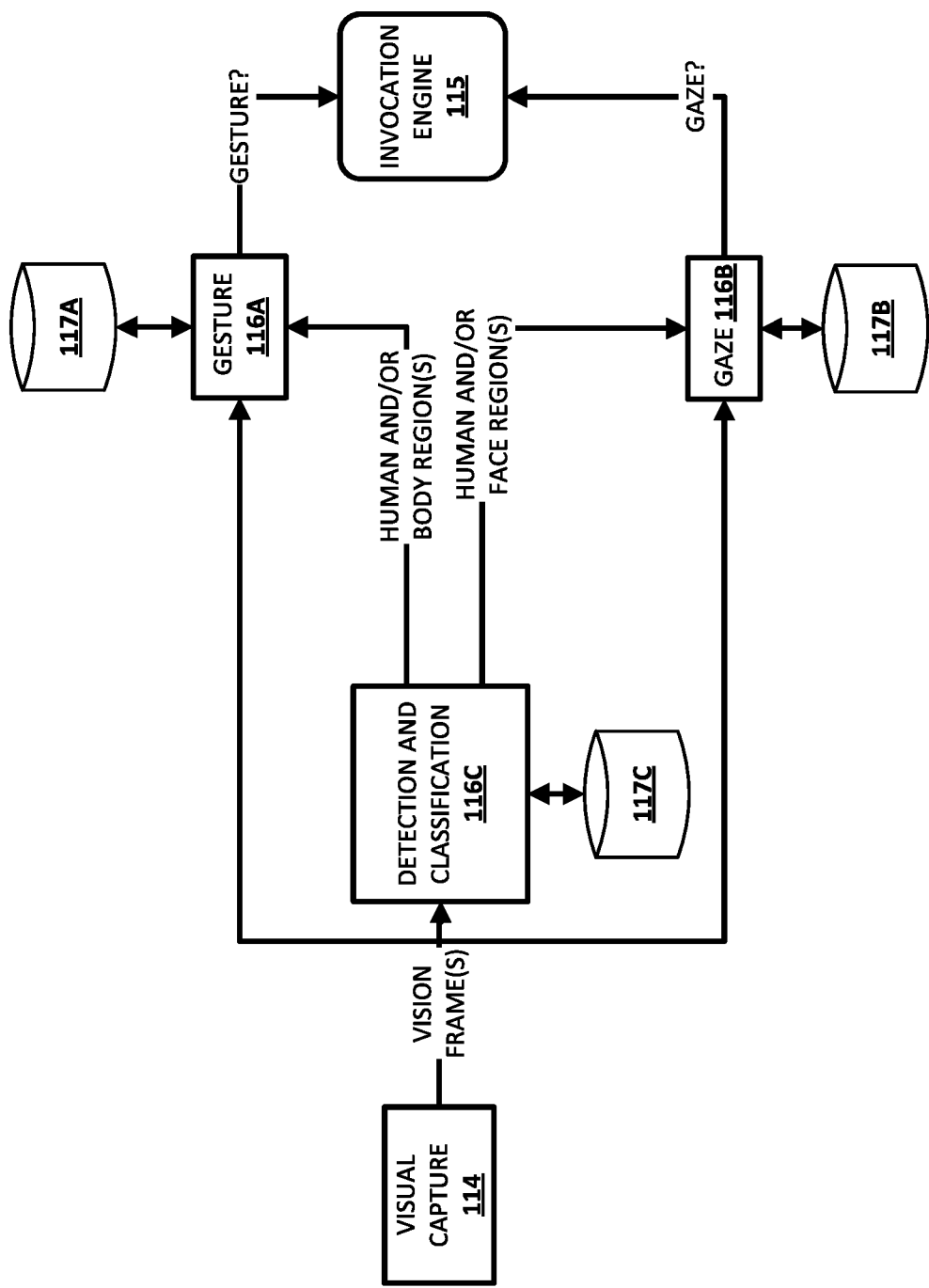

Referring now to FIGS. 2A, 2B, and 2C, various examples are depicted of how gaze and gesture module 116 can detect a particular gesture and/or a directed gaze, and how invocation engine 115 can invoke one or more previously dormant automated assistant functions in response.

Turning initially to FIG. 2A, visual capture module 114 provides vision frames to gaze and gesture module 116. In some implementations, visual capture module 114 provides a real-time stream of vision frames to the gaze and gesture module 116. In some of those implementations, the visual capture module 114 begins providing the vision frames in response to signals from a separate presence sensor 105 indicating that a human is present in the environment with the client device 106. For example, the presence sensor 105 can be PIR sensor and can provide a signal to visual capture module 114 in response to detecting human presence. Visual capture module 114 may refrain from providing any vision frames to gaze and gesture module 116 unless human presence is detected. In other implementations where visual capture module 114 only selectively provides vision frames to the gaze and gesture module 116, additional and/or alternative cues can be utilized to initiate such provisioning. For example, human presence can be detected based on audio data from speech capture module 112, based on analysis of vision frames by one or more other components, and/or other signals.

The gaze and gesture module 116 processes the vision frames using one or more machine learning models 117 to monitor for the occurrence of both a directed gaze and a particular gesture. When both the directed gaze and the particular gesture are detected, the gaze and gesture module 116 provides an indication of detection of the gaze and gesture to invocation engine 115.

In FIG. 2A, the visual frames and/or audio data (provided by speech capture module 112) are also provided to other conditions module 118. The other conditions module 118 processes the provided data, optionally using one or more other machine learning models 119, to monitor for occurrence of one or more other conditions. For example, the other conditions can be detecting any voice activity based on the audio data; detecting presence of a spoken invocation phrase in the audio data; detecting, based on the audio data voice activity that is from a direction or location of the user; detecting, based on the visual frame(s) and/or the audio data that the user is an authorized user; detecting, based on the visual frames, mouth movement of the user (that provided the gesture and the directed gaze); etc. When the other condition(s) are detected, the other conditions module 118 provides an indication of the occurrence of the other conditions to invocation engine 115.

When the invocation engine 115 receives an indication of the directed gaze and gesture, and a temporally proximate indication of the other conditions, the invocation engine 115 causes invocation of dormant function(s) 101. For example, the invocation of the dormant function(s) 101 can include one or more of: activating a display screen of the client device 106; causing content to be visually and/or audibly rendered by the client device 106; causing visual frames and/or audio data to be transmitted by the client device 106 to one or more cloud-based automated assistant component(s) 130; etc.

In some implementations, and as described in more detail with respect to FIGS. 2B and 2C, the gaze and gesture module 116 can use one or more first machine learning models 117 for detecting a directed gaze, and one or more second machine learning models 117 for detecting gestures.

In some other implementations, the gaze and gesture module 116 can utilize an end-to-end machine learning model that accepts, as input, visual frames (or features thereof) and that can be utilized to generate (based on processing of the input over the model) output that indicates whether a particular gesture and a directed gaze have occurred. Such a machine learning model can be, for example, a neural network model, such as a recurrent neural network (RNN) model that includes one or more memory layers (e.g., long short-term memory (LSTM) layer(s)). Training of such an RNN model can be based on training examples that include, as training example input, a sequence of visual frames (e.g., a video) and, as training example output, an indication of whether the sequence includes both a gesture and a directed gaze. For example, the training example output can be a single value that indicates whether both the gesture and directed gaze are present. As another example, the training example output can include a first value that indicates whether a directed gaze is present and N additional values that each indicate whether a corresponding one of N gestures is included (thereby enabling training of the model to predict a corresponding probability for each of N separate gestures). As yet another example, the training example output can include a first value that indicates whether a directed gaze is present and a second value that indicates whether any of one or more particular gestures is present (thereby enabling training of the model to predict a probability that corresponds to whether any gesture is included).

In implementations where the model is trained to predict a corresponding probability for each of N separate gestures, the gaze and gesture module 116 can optionally provide invocation engine 115 with an indication of which of the N gestures occurred. Further, the invocation of the dormant functions 101 by the invocation engine 115 can be dependent on which of the N separate gestures occurred. For example, for a "wave" gesture the invocation engine 115 can cause certain content to be rendered on a display screen of the client device; for a "thumbs up" gesture the invocation engine 115 can cause audio data and/or visual frame(s) to be transmitted to cloud-based automated assistant component(s) 130; and for a "high five" gesture the invocation engine 115 can cause a "routine" of automated assistant actions to be performed, such as turning on a smart coffee maker, turning on certain smart lights, and audibly rendering a news summary.

FIG. 2B illustrates an example where gesture and gaze detection module 116 includes a gesture module 116A that utilizes a gesture machine learning model 117A in monitoring for occurrence of a gesture, and includes a gaze module 116B that utilizes a gaze machine learning model 117B in monitoring for occurrence of a directed gaze. Other condition(s) module 118 is not illustrated in FIG. 2B for simplicity, but can also optionally be utilized in combination with gesture module 116A and 117B in a similar manner as described with respect to FIG. 2A.

In FIG. 2B, visual capture module 114 provides vision frames. Lower resolution versions of the vision frames are provided to gesture module 116A and higher resolution versions of the vision frames are stored in a buffer 104. The lower resolution versions are of a lower resolution relative to the higher resolution versions. The higher resolution versions can be uncompressed, or compressed less relative to the lower resolution versions. The buffer 104 can be a first in first out buffer and can temporarily store a most recent duration of higher resolution vision frames.

In the example of FIG. 2B, the gesture module 116A can process the lower resolution vision frames in monitoring for presence of a gesture and the gaze module 116B can be inactive until the gesture module 116A detects the occurrence of a gesture. When occurrence of the gesture is detected, the gesture module 116A can provide an indication of detection of the gesture to the gaze module 116B and to the invocation engine 115. The gaze module 116B can be activated in response to receiving the indication of detection of the gesture, retrieve buffered higher resolution vision frames from the buffer 104, and utilize the buffered higher resolution vision frames (and optionally further higher resolution vision frames) in determining whether a directed gaze is present. In this manner, the gaze module 116B is only selectively activated, thereby conserving computational resources that would otherwise be consumed by additional processing of higher resolution vision frames by the gaze module 116B.

The gesture module 116A can use one or more gesture machine learning models 117A for detecting a particular gesture. Such a machine learning model can be, for example, a neural network model, such as an RNN model that includes one or more memory layers. Training of such an RNN model can be based on training examples that include, as training example input, a sequence of visual frames (e.g., a video) and, as training example output, an indication of whether the sequence includes one or more particular gestures. For example, the training example output can be a single value that indicates whether a single particular gesture is present. For instance, the single value can be a "0" when the single particular gesture is not present and a "1" when the single particular gesture is present. In some of those examples, multiple gesture machine learning models 117A are utilized, each tailored to a different single particular gesture. As another example, the training example output can include N values that each indicate whether a corresponding one of N gestures is included (thereby enabling training of the model to predict a corresponding probability for each of N separate gestures). In implementations where the model is trained to predict a corresponding probability for each of N separate gestures, the gesture module 116A can optionally provide invocation engine 115 with an indication of which of the N gestures occurred. Further, the invocation of the dormant functions by the invocation engine 115 can be dependent on which of the N separate gestures occurred.

The gaze module 116B can use one or more gaze machine learning models 117A for detecting a directed gaze. Such a machine learning model can be, for example, a neural network model, such as a convolutional neural network (CNN) model. Training of such a CNN model can be based on training examples that include, as training example input, a visual frames (e.g., an image) and, as training example output, an indication of whether the image includes a directed gaze. For example, the training example output can be a single value that indicates whether directed gaze is present. For example, the single value can be a "0" when no directed gaze is present, a "1" when a gaze is present that is directed directly at, or within 5 degrees of, a sensor that captures the image, a "0.75" when a gaze is present that is directed within 5-10 degrees of a sensor that captures the image, etc.

In some of those and/or other implementations, the gaze module 116B determines a directed gaze only when a directed gaze is detected with at least a threshold probability and/or for at least a threshold duration. For example, a stream of image frames can be processed using the CNN model and processing each frame can result in a corresponding probability that the frame includes a directed gaze. The gaze module can determine there is a directed gaze only if at least X % of a sequence of image frames (that corresponds to the threshold duration) has a corresponding probability that satisfies a threshold. For instance, assume X % is 60%, the probability threshold is 0.7, and the threshold duration is 0.5 seconds. Further assume 10 image frames correspond to 0.5 seconds. If the image frames are processed to generate probabilities of [0.75, 0.85, 0.5, 0.4, 0.9, 0.95, 0.85, 0.89, 0.6, 0.85], a directed gaze can be detected since 70% of the frames indicated a directed gaze with a probability that is greater than 0.7. In these and other manners, even when a user briefly diverts his/her gaze direction, a directed gaze can be detected. Additional and/or alternative machine learning models (e.g., RNN models) and/or techniques can be utilized to detect a directed gaze that occurs with at least a threshold duration.

FIG. 2C illustrates another example where gesture and gaze detection module 116 includes a gesture module 116A that utilizes a gesture machine learning model 117A in monitoring for occurrence of a gesture, and includes a gaze module 116B that utilizes a gaze machine learning model 117B in monitoring for occurrence of a directed gaze. Other condition(s) module 118 is not illustrated in FIG. 2B for simplicity, but can also optionally be utilized in combination with gesture module 116A and 117B in a similar manner as described with respect to FIG. 2A. Also, buffer 104 and higher resolution/lower resolution vision frames of FIG. 2B are not illustrated in FIG. 2C for simplicity, but similar techniques can be implemented in FIG. 2C (e.g., higher resolution portions of vision frames can be provided to gaze module 116B).

In FIG. 2C, visual capture module 114 provides vision frames to detection and classification module 116C. Detection and classification module 116C utilizes an object detection and classification machine learning model 117C to classify various regions of each vision frame. For example, detection and classification module 116C can classify human region(s) (if any) of each vision frame that corresponds to a human and provide an indication of such human region(s), for each vision frame, to gesture module 116A and gaze module 116B. Also, for example, detection and classification module 116C can classify region(s) (if any) of each vision frame that corresponds to body region(s) (e.g., arms and torso) of a human and provide an indication of such region(s), for each vision frame, to gesture module 116A. Also, for example, detection and classification module 116C can classify region(s) (if any) of each vision frame that corresponds to face region(s) of a human and provide an indication of such region(s), for each vision frame, to gaze module 116B.

In some implementations, the gesture module 116A can utilize the provided region(s) to process only corresponding portion(s) of each vision frame. For example, the gesture module 116A can "crop" and resize the vision frames to process only those portion(s) that include human and/or body region(s). In some of those implementations, the gesture machine learning model(s) 117A can be trained based on vision frames that are "cropped" and the resizing can be to a size that conforms to input dimensions of such a model. In some additional or alternative implementations, the gesture module 116A can utilize the provided region(s) to skip processing of some vision frames all together (e.g., those indicated as not including human and/or body regions). In yet other implementations, the gesture module 116A can utilize the provided region(s) as an attention mechanism (e.g., as a separate attention input to the gesture machine learning model 117A) to focus the processing of each vision frame.

Likewise, in some implementations, the gaze module 116B can utilize the provided region(s) to process only corresponding portion(s) of each vision frame. For example, the gaze module 116B can "crop" and resize the vision frames to process only those portion(s) that include human and/or face region(s). In some of those implementations, the gaze machine learning model 117B can be trained based on vision frames that are "cropped" and the resizing can be to a size that conforms to input dimensions of such a model. In some additional or alternative implementations, the gaze module 116B can utilize the provided region(s) to skip processing of some vision frames all together (e.g., those indicated as not including human and/or face regions). In yet other implementations, the gaze module 116B can utilize the provided region(s) as an attention mechanism (e.g., as a separate attention input to the gaze machine learning model 117B) to focus the processing of each vision frame.

In some implementations, detection and classification model 116C can additionally or alternatively provide indications of certain region(s) to other conditions module 118 (not depicted in FIG. 2C for simplicity) for use by other conditions module 118. For example, face region(s) can be used by other conditions module 118 in detecting mouth movement utilizing a corresponding mouth movement machine learning model, when mouth movement is an additional condition for invoking inactive function(s).

In some implementations, detection and classification model 116C can additionally or alternatively provide, to gesture module 116A and gaze module 116B, indications of region(s) that are classified as TVs or other video display sources. In some of those implementations, the modules 116A and 116B can crop those region(s) out of processed vision frames, focus attention away from those regions, and/or otherwise ignore those regions in detections or lessen the chances that detections will be based on such regions. In these and other manners, false-positive invocations of dormant function(s) can be mitigated.

Figure 3:
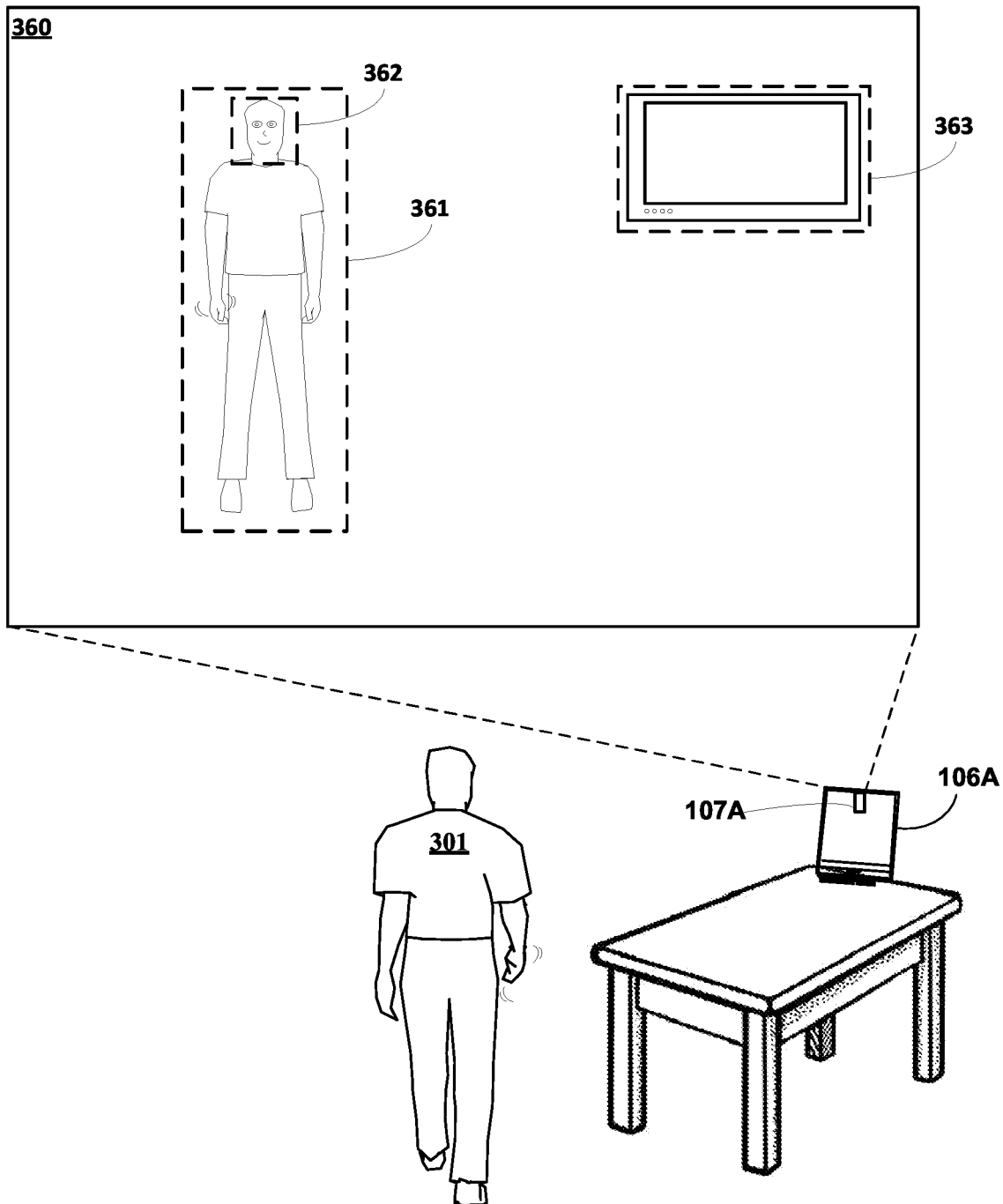
FIG. 3 depicts an example of an assistant device and a user providing a gesture and a directed gaze, and also depicts an image captured by a camera of the assistant device when the user is providing the gesture and directed gaze.

FIG. 3 depicts an example of client device 106 and vision component 107 of FIG. 1. In FIG. 3, the example client device is denoted as 106A and further includes speaker(s) and a display. In FIG. 3, the example vision component is denoted as 107A and is a camera. FIG. 3 also depicts a user 301 providing a hand movement gesture (indicated by "movement" lines near the user's right hand) and a gaze that is directed to the camera 107A.

FIG. 3 also depicts an example of an assistant device and a user providing a gesture and a directed gaze, and also depicts an example image 360 captured by the camera 107A when the user is providing the gesture and directed gaze. It can be seen that the user is captured in the image 360, as well as a television that is behind the user (and thus not visible in the perspective view of FIG. 3).

In image 360, a bounding box 361 is provided and represents a region of the image that can be determined (e.g., by detection and classification module 116C of FIG. 2C) to correspond to a human. In some implementations, a gesture detection module operating on client device 106A can process only that portion of the image (or focus attention on that portion) in monitoring for a particular gesture, based on that portion being indicated as a portion that corresponds to a human.

In image 360, a bounding box 362 is also provided and represents a region of the image that can be determined (e.g., by detection and classification module 116C of FIG. 2C) to correspond to a face. In some implementations, a gaze detection module operating on client device 106A can process only that portion of the image (or focus attention on that portion) in monitoring for a directed gaze, based on that portion being indicated as a portion that corresponds to a face. Although only a single image is depicted in FIG. 3, in various implementations directed gaze detection and/or gesture detection can be based on a sequence of images as described herein.

In image 360, a bounding box 363 is also provided and represents a region of the image that can be determined to correspond to a video display and that might raise false positives of visual cues. For example, the television might render video showing one or more individuals making gestures, looking into the camera, etc., any of which could be misinterpreted as occurrence of a gesture and/or directed gaze. In some implementations, detection and classification module 116C of FIG. 2C can determine such a region (e.g., based on detecting a TV classification) and/or such a region can be determined based on analysis of image 360 and preceding images to determine the region has a display frequency that corresponds to a display frequency of a video display (e.g., approximately 60 Hz, 120 Hz, and/or other typical video display frequency). In some implementations, a gaze detection module and/or gesture module can crop that region out of processed vision frames, focus attention away from that region, and/or otherwise ignore that region in detections or lessen the chances that detections will be based on such regions. In these and other manners, false-positive invocations of dormant function(s) can be mitigated.

Figure 4A:
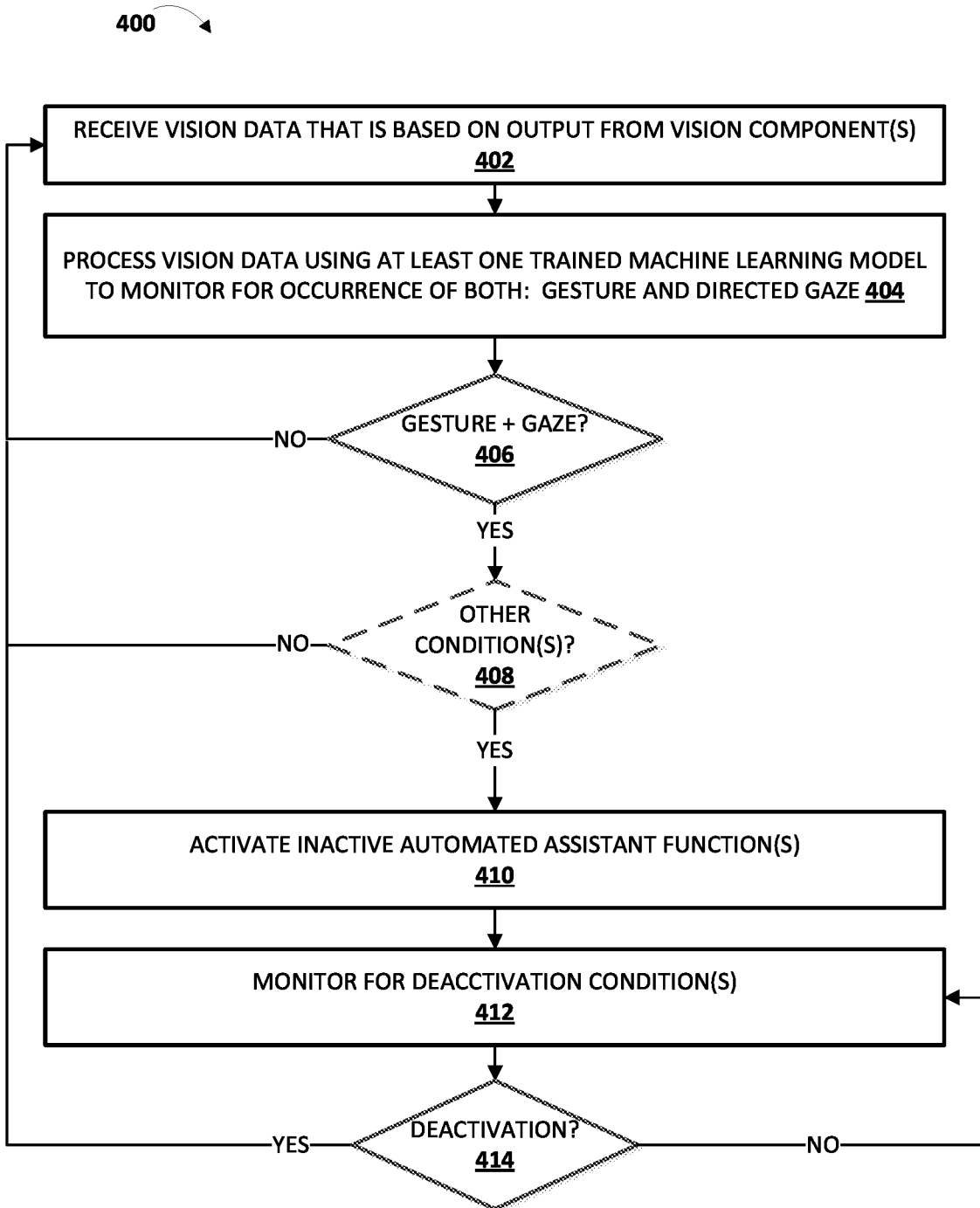
FIG. 4A depicts a flowchart illustrating an example method according to implementations disclosed herein.
Figure 4B:
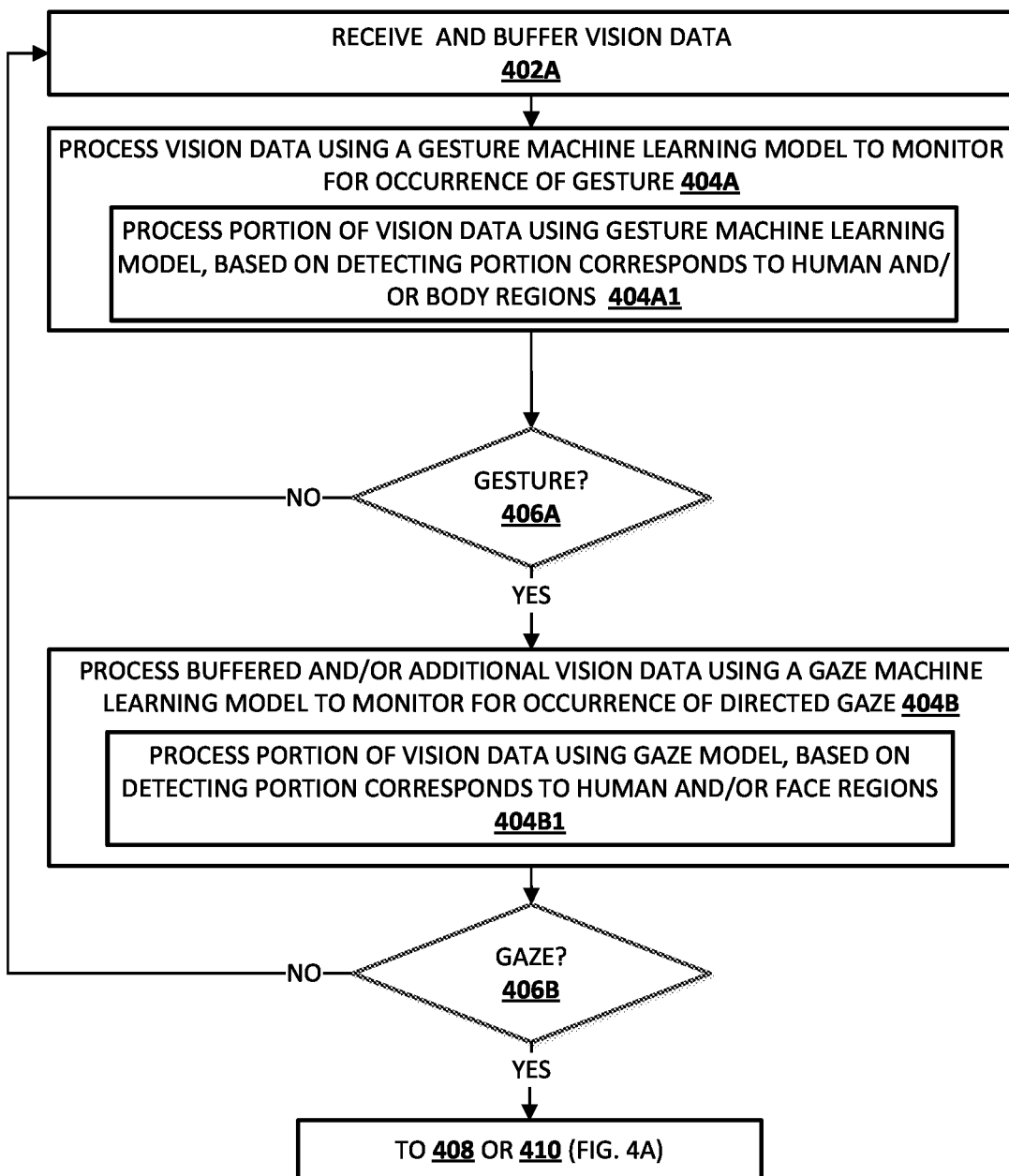
FIG. 4B depicts a flowchart illustrating a particular example of certain blocks of the example method of FIG. 4A.

FIG. 4A is a flowchart illustrating an example method 400 according to implementations disclosed herein. FIG. 4B is a flowchart illustrating an example of implementations of blocks 402, 404, and 406 of FIG. 4A. For convenience, the operations of the flow charts of FIGS. 4A and 4B are described with reference to a system that performs the operations. This system may include various components of various computer systems, such as one or more components of computing system(s) that implement automated assistant 120 (e.g., a client device and/or remote computing system(s)). Moreover, while operations of method 400 are shown in a particular order, this is not meant to be limiting. One or more operations may be reordered, omitted or added.

At block 402, the system receives vision data that is based on output from vision component(s). In some implementations, the vision component(s) can be integrated with a client device that includes an assistant client. In some implementations, the vision component(s) can be separate from, but in communication with, the client device. For example, the vision component(s) can include a stand-alone smart camera that is in wired and/or wireless communication with a client device that includes an assistant client.

At block 404, the system processes vision data using at least one machine learning model, to monitor for occurrence of both: a gesture and a directed gaze.

At block 406, the system determines whether both a gesture and a gaze have been detected based on the monitoring of block 404. If not, the system proceeds back to block 402, receives additional vision data, and performs another iteration of blocks 404 and 406. In some implementations, the system determines both a gesture and a gaze have been detected based on detecting a gesture and directed gaze co-occur or occur within a threshold temporal proximity of one another. In some additional or alternative implementations, the system determines both a gesture and a gaze have been detected based on detecting the gesture is of at least a threshold duration (e.g., "waving" for at least X duration or "thumbs up" for at least X duration) and/or the directed gaze is of at least a threshold duration (which can be that same or different from that optionally used for the gesture duration).

If, at an iteration of block 406, the system determines that both a gesture and a gaze have been detected based on the monitoring of block 404, the system optionally proceeds to block 408 (or, when block 408 is not included, directly to block 410).

At optional block 408, the system determines whether one or more other conditions are satisfied. If not, the system proceeds back to block 402, receives additional vision data, and performs another iteration of blocks 404, 406, and 408. If so, the system proceeds to block 410. The system can determine whether one or more other conditions are satisfied using the vision data received at block 402, audio data, and/or other sensor or non-sensor data. Various other condition(s) can be considered by the system, such as those explicitly described herein.

At block 410, the system activates one or more inactive automated assistant functions. The system can activate various inactive automated assistant functions, such as those described explicitly herein. In some implementations different types of gestures can be monitored for in block 404, and which inactive function(s) are activated in block 410 can be dependent on the particular type of gesture that is detected in the monitoring of block 404.

At block 412, the system monitors for deactivation condition(s), for the automated assistant function(s) activated at block 410. Deactivation condition(s) can include, for example, a timeout, at least a threshold duration of lack of lack of detected spoken input and/or detected directed gaze, an explicit stop command (spoken, gestured, or touch inputted), and/or other condition(s).

At block 414, the system determines whether deactivation condition(s) have been detected based on the monitoring of block 412. If not, the system proceeds back to block 412 and continues to monitor for the deactivation condition(s). If so, the system can deactivate the function(s) activated at block 410, and proceeds back to block 402 to again receive vision data and again monitor for the occurrence of both an invocation gesture and a gaze.

As one example of blocks 412 and 414, where the activated function(s) include the streaming of audio data to one or more cloud-based automated assistant component(s), the system can stop the streaming in response to detecting a lack of voice activity for at least a threshold duration (e.g., using a VAD), in response to an explicit stop command, or in response to detecting (through continued gaze monitoring) that the user's gaze has not been directed to the client device for at least a threshold duration.

Turning now to FIG. 4B, one example of implementations of blocks 402, 404, and 406 of FIG. 4A is illustrated. FIG. 4B illustrates an example where gesture detection and directed gaze detection are performed utilizing separate models, and where monitoring for a directed gaze occurs only in response to first detecting a gesture. In FIG. 4B, block 402A is a specific example of block 402 of FIG. 4A, blocks 404A and 404B are specific examples of block 404 of FIG. 4A, and blocks 406A and 406B are specific examples of block 406 of FIG. 4A.

At block 402A, the system receives and buffers vision data.

At block 404A, the system processes the vision data using a gesture machine learning model to monitor for occurrence of a gesture. In some implementations, block 404A includes sub-block 404A1, where the system processes a portion of the vision data, using the gesture machine learning model, based on detecting that the portion corresponds to human and/or body regions.

At block 406A, the system determines whether a gesture has been detected based on the monitoring of block 404A. If not, the system proceeds back to block 402A, receives and buffers additional vision data, and performs another iteration of block 404A.

If, at an iteration of block 406A, the system determines that a gesture has been detected based on the monitoring of block 404A, the system proceeds to block 404B.

At block 404B, the system processes buffered and/or additional vision data using a gaze machine learning model to monitor for occurrence of a directed gaze.

In some implementations, block 404B includes sub-block 40461, where the system processes a portion of the vision data, using the gaze machine learning model, based on detecting that the portion corresponds to human and/or face regions.

At block 406B, the system determines whether a directed gaze has been detected based on the monitoring of block 40BA. If not, the system proceeds back to block 402A, receives and buffers additional vision data, and performs another iteration of block 404A.

If, at an iteration of block 406B, the system determines that a gesture has been detected based on the monitoring of block 404B, the system proceeds to block 408 or 410 of FIG. 4A.

Various examples are described herein of activating dormant assistant function(s) in response to detecting both a particular gesture and a directed gaze. However, in various implementations dormant assistant function(s) can be activated in response to detecting only one of: a particular gesture, and a directed gaze, optionally in combination with one or more other conditions, such as those described herein. For example, in some of those various implementations, dormant assistant function(s) can be activated in response to detecting a directed gaze of a user that is of at least a threshold duration, along with co-occurring other condition(s) such as mouth movement of the user. Also, for example, in some of those various implementations, dormant assistant function(s) can be activated in response to detecting a gesture of a user, along with co-occurring and/or temporally proximal other condition(s) such as detected voice activity.

Figure 5:
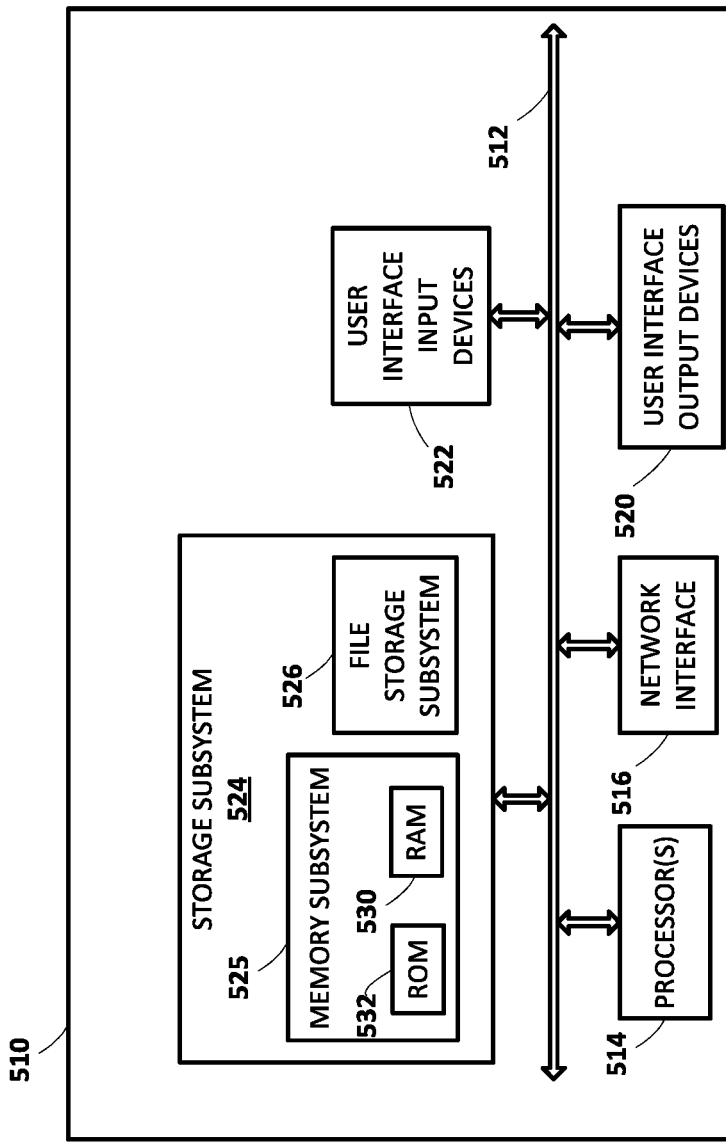
FIG. 5 illustrates an example architecture of a computing device.

FIG. 5 is a block diagram of an example computing device 510 that may optionally be utilized to perform one or more aspects of techniques described herein. In some implementations, one or more of a client computing device, user-controlled resources module 130, and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the method of FIGS. 4A and 4B, as well as to implement various components depicted in FIGS. 1, 2A-2C, and 3.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used. For example, in some implementations, users may opt out of assistant devices using vision component 107 and/or using vision data from vision component 107 in monitoring for occurrence of gestures and/or directed gazes.

What is claimed is:

1. A method implemented by one or more processors of a client device that facilitates touch-free interaction between one or more users and an automated assistant, the method comprising:
   receiving a stream of image frames that are based on output from one or more cameras of the client device;
   processing the image frames of the stream using at least one trained machine learning model stored locally on the client device to monitor for occurrence of both:
      an invocation gesture of a user captured by at least one of the image frames, wherein the invocation gesture is touch-free, is performed by the user, and is visually detectable in the at least one of the image frames, and
      a gaze of the user that is directed toward the client device,
         wherein processing the image frames of the stream using the at least one trained machine learning model to monitor for the occurrence of the invocation gesture comprises processing first resolution versions of the image frames without processing second resolution versions of the image frames, and
         wherein processing the image frames of the stream using the at least one trained machine learning model to monitor for the occurrence of the gaze comprises processing the second resolution versions of the image frames;
   detecting, based on the monitoring, occurrence of both:
      the invocation gesture, and
      the gaze; and
   in response to detecting the occurrence of both the invocation gesture and the gaze:
      causing at least one function of the automated assistant to be activated.

2. The method of claim 1, wherein the at least one function of the automated assistant that is activated in response to detecting the occurrence of both the invocation gesture and the gaze comprises:
   transmitting of audio data, captured via one or more microphones of the client device, to a remote server associated with the automated assistant.

3. The method of claim 1, wherein the at least one function that is activated in response to detecting the occurrence of both the invocation gesture and the gaze comprises:
   transmitting of additional image frames to a remote server associated with the automated assistant, the additional image frames based on output from one or more of the cameras and received after detecting the occurrence of both the invocation gesture and the gaze.

4. The method of claim 1, wherein processing the image frames of the stream using at least one trained machine learning model stored locally on the client device to monitor for occurrence of both the invocation gesture and the gaze comprises:
   processing the image frames using a first trained machine learning model to predict a region of the image frames that includes a human face; and
   processing the region of the image frames using a second trained machine learning model trained to detect the gaze of the user.

5. The method of claim 1, further comprising:
   detecting, based on a signal from a presence sensor, that a human is present in an environment of the client device; and
   causing the one or more cameras to provide the stream of image frames in response to detecting that the human is present in the environment.

6. The method of claim 1, further comprising:
   receiving a stream of audio data frames that are based on output from one or more microphones of the client device;
   processing the audio data frames of the stream using at least one trained invocation phrase detection machine learning model stored locally on the client device to monitor for occurrence of a spoken invocation phrase;
   detecting the occurrence of the spoken invocation phrase based on the monitoring for the occurrence of the spoken invocation phrase; and
   wherein causing the at least one function of the automated assistant to be activated is in response to detecting the occurrence of the spoken invocation phrase in temporal proximity to both the invocation gesture and the gaze.

7. The method of claim 6, wherein the at least one function that is activated comprises one or both of:
   transmitting of additional audio data frames captured via the one or more microphones of the client device, to a remote server associated with the automated assistant; and
   transmitting of one or more additional image frames from one or more of the cameras, to the remote server associated with the automated assistant.

8. The method of claim 1, wherein processing the image frames of the stream using at least one trained machine learning model stored locally on the client device to monitor for occurrence of both the invocation gesture and the gaze comprises:
   determining that a region of the image frames corresponds to an electronic display; and
   in response to determining that the region corresponds to the electronic display, ignoring the region in monitoring for the occurrence of both the invocation gesture and the gaze.

9. The method of claim 8, wherein determining that the region of the image frames corresponds to the electronic display is based on detecting a display frequency, in the region of the image frames, that corresponds to an electronic display frequency.

10. The method of claim 1, wherein the at least one function that is activated in response to detecting the occurrence of both the invocation gesture and the gaze comprises:
   processing of buffered audio data at the client device, the buffered audio data being stored in memory at the client device and being captured via one or more microphones of the client device, and the processing of the buffered audio data including one or both of:
invocation phrase detection processing, and
automatic speech recognition.

11. The method of claim 10, wherein the processing of the buffered audio data comprises the automatic speech recognition, and wherein the automatic speech recognition comprises voice-to-text processing.

12. The method of claim 10, wherein the processing of the buffered audio data comprises invocation phrase detection processing and further comprising:
in response to the invocation phrase detection processing detecting presence of an invocation phrase in the buffered audio data, performing one or both of:
transmitting further audio data, captured via the one or more microphones of the client device, to a remote server associated with the automated assistant; and
transmitting of additional image frames to a remote server associated with the automated assistant, the additional image frames based on output from one or more of the cameras and received after detecting the occurrence of both the invocation gesture and the gaze.

13. The method of claim 1, wherein processing the image frames of the stream using at least one trained machine learning model stored locally on the client device to monitor for occurrence of both the invocation gesture and the gaze comprises:
using a first trained machine learning model in processing the first resolution version of the image frames to monitor for occurrence of the invocation gesture; and
using a second trained machine learning model in processing the second resolution version of the image frames to monitor for the gaze of the user that is directed toward the client device.

14. The method of claim 13, wherein using the second trained machine learning model to monitor for the gaze of the user that is directed toward the client device occurs only in response to detecting occurrence of the invocation gesture using the first trained machine learning model.

15. The method of claim 14, wherein the first resolution versions of the image frames are lower resolution relative to the second resolution versions of the image frames, and further comprising:
storing the second resolution versions of the image frames in a buffer during using the first trained machine learning model to monitor for occurrence of the invocation gesture; and
retrieving the second resolution versions of the image frames, for processing using the second machine learning model, only in response to detecting occurrence of the invocation gesture using the first trained machine learning model.

16. A client device comprising:
at least one vision component;
at least one microphone;
one or more processors;
memory operably coupled with the one or more processors, wherein the memory stores instructions that, in response to execution of the instructions by one or more of the processors, cause one or more of the processors to perform the following operations:
receiving a stream of vision data that is based on output from the vision component of the client device;
receiving a stream of audio data that is based on output from the microphone of the client device;
processing the vision data using at least one trained machine learning model stored locally on the client device to monitor for occurrence of both:
an invocation gesture of a user captured by the vision data, wherein the invocation gesture is touch-free, is performed by the user, and is visually detectable in the vision data, and
a gaze of the user that is directed toward the client device;
detecting, based on the monitoring, occurrence of both:
the invocation gesture, and
the gaze;
determining that the audio data corresponds to the user that provided the invocation gesture and the gaze; and
in response to detecting the occurrence of both the invocation gesture and the gaze, and contingent on determining that the audio data corresponds to the user that provided the invocation gesture and the gaze:
transmitting, by the client device to one or more remote automated assistant components, one or both of:
additional vision data that is based on output from the vision component, and
at least a portion of the audio data that is based on output from the microphone of the client device.

17. The client device of claim 16, wherein the operations further include:
receiving, in response to the transmitting, responsive content; and
rendering the responsive content via one or more user interface output devices of the client device.

* * * * *